(12) United States Patent
Yokoi et al.

(10) Patent No.: US 12,475,711 B2
(45) Date of Patent: Nov. 18, 2025

(54) OBJECT DETECTION DEVICE

(71) Applicants: DENSO CORPORATION, Kariya (JP); TOYOTA JIDOSHA KABUSHIKI KAISHA, Toyota (JP)

(72) Inventors: Yuusuke Yokoi, Kariya (JP); Kazunori Nogi, Toyota (JP); Yuma Hoshikawa, Toyota (JP)

(73) Assignees: DENSO CORPORATION, Kariya (JP); TOYOTA JIDOSHA KABUSHIKI, Toyota (JP)

( * ) Notice: Subject to any disclaimer, the term of this patent is extended or adjusted under 35 U.S.C. 154(b) by 371 days.

(21) Appl. No.: 17/815,083

(22) Filed: Jul. 26, 2022

(65) Prior Publication Data
US 2022/0366702 A1 Nov. 17, 2022

Related U.S. Application Data

(63) Continuation of application No. PCT/JP2021/002660, filed on Jan. 26, 2021.

(30) Foreign Application Priority Data

Jan. 28, 2020 (JP) ................. 2020-011990

(51) Int. Cl.
*G06V 20/58* (2022.01)
*G01S 13/86* (2006.01)
(Continued)

(52) U.S. Cl.
CPC ............ *G06V 20/58* (2022.01); *G01S 13/867* (2013.01); *G01S 13/931* (2013.01); *G06V 10/80* (2022.01); *G08G 1/16* (2013.01); *G06V 2201/07* (2022.01)

(58) Field of Classification Search
CPC .... G06V 20/58; G06V 2201/07; G06V 10/80; G06V 10/143; G01S 13/867;
(Continued)

(56) References Cited

U.S. PATENT DOCUMENTS 6,337,637 B1 * 1/2002 Kubota ..................... B60T 7/18
340/901
8,352,173 B2 * 1/2013 Greene .................. G08G 1/166
340/436
(Continued)

FOREIGN PATENT DOCUMENTS

JP 2008-065634 A 3/2008
JP 2014-122873 A 7/2014
(Continued)

*Primary Examiner* — Chan S Park
*Assistant Examiner* — Paulo Andres Garcia
(74) *Attorney, Agent, or Firm* — Maschoff Brennan (57) ABSTRACT

An object detection device detects objects around an own vehicle by fusing a plurality of pieces of target information obtained by detecting the objects as targets using a plurality of detection sensors with different detection accuracies, and includes a crowd determination unit that determines that a target other than a reference target detected in a predetermined crowd region based on the reference target selected from the targets is a crowd target; a region setting unit that sets a search region so as to include a crowd determination region in which the reference target and the crowd target are detected; and an object determination unit that determines an object indicated by a target in the search region by fusing the target information for the search region.

4 Claims, 4 Drawing Sheets

(51) Int. Cl.
*G01S 13/931* (2020.01)
*G06V 10/80* (2022.01)
*G08G 1/16* (2006.01)

(58) Field of Classification Search
CPC ...... G01S 13/931; G01S 13/865; G01S 7/411; G08G 1/16; G08G 1/166
See application file for complete search history.

(56) References Cited

U.S. PATENT DOCUMENTS

| | | | | |
|---|---|---|---|---|
| 10,088,551 | B2* | 10/2018 | Kwakkernaat | G01S 13/876 |
| 10,235,768 | B2* | 3/2019 | Sasaki | G06T 7/70 |
| 10,679,506 | B2* | 6/2020 | Szulc | G01S 13/931 |
| 11,222,541 | B2* | 1/2022 | Ikeda | G08G 1/0116 |
| 11,987,271 | B2* | 5/2024 | Yamamoto | B60W 60/0027 |
| 2003/0174054 | A1* | 9/2003 | Shimomura | G01S 13/931 |
| | | | | 250/526 |
| 2008/0019567 | A1* | 1/2008 | Takagi | G06V 20/58 |
| | | | | 382/103 |
| 2009/0303078 | A1* | 12/2009 | Mochizuki | G08G 1/166 |
| | | | | 340/901 |
| 2014/0139369 | A1 | 5/2014 | Baba | |
| 2015/0161796 | A1* | 6/2015 | Choi | G06V 40/10 |
| | | | | 348/77 |
| 2017/0174227 | A1* | 6/2017 | Tatourian | G06V 20/58 |
| 2017/0336504 | A1* | 11/2017 | Kai | G01S 13/58 |
| 2017/0356993 | A1* | 12/2017 | Lee | G01S 13/93 |
| 2018/0350083 | A1* | 12/2018 | Fang | G06F 18/254 |
| 2019/0236958 | A1 | 8/2019 | Fang et al. | |
| 2019/0263398 | A1* | 8/2019 | Matsunaga | G05D 1/0088 |

FOREIGN PATENT DOCUMENTS

| | | |
|---|---|---|
| JP | 2017-59095 A | 3/2017 |
| WO | 2018/002985 A1 | 1/2018 |

* cited by examiner

OBJECT DETECTION DEVICE

CROSS-REFERENCE TO RELATED APPLICATION

The present application is based on and claims the benefit of priority from earlier Japanese Patent Application No. 2020-011990 filed Jan. 28, 2020, the description of which is incorporated herein by reference.

BACKGROUND

Technical Field

The present disclosure relates to an object detection device that detects objects around a vehicle and the like.

Related Art

An object detection device that detects objects around an own vehicle is applied to a collision avoidance system or the like that executes collision avoidance control of the own vehicle. In a known object detection device, the identity of a plurality of pieces of target information acquired from different types of detection sensors for objects is determined and fused (subjected to data fusion) during object detection.

SUMMARY

An aspect of the present disclosure provides an object detection device that detects objects around an own vehicle by fusing a plurality of pieces of target information obtained by detecting the objects as targets using a plurality of detection sensors with different detection accuracies, the object detection device including: a crowd determination unit that determines whether a target other than a reference target detected in a predetermined crowd region based on the reference target selected from the targets is a crowd target; a region setting unit that sets a search region so as to include a crowd determination region in which the reference target and the crowd target are detected; and an object determination unit that determines an object indicated by a target in the search region by fusing the target information for the search region.

DETAILED DESCRIPTION OF THE PREFERRED EMBODIMENTS

An object detection device that detects objects around an own vehicle is applied to a collision avoidance system or the like that executes collision avoidance control of the own vehicle. In a known object detection device, the identity of a plurality of pieces of target information acquired from different types of detection sensors for objects is determined and fused (subjected to data fusion) during object detection. For example, in the technique disclosed in JP 2014-122873 A, when it is determined that a radar target acquired from a radar sensor and an image target acquired from a camera sensor indicate the same object, collision mitigation control is executed according to the reliability of the determination and the type of object.

In situations where there is a plurality of objects to be detected and they are closely spaced from each other, target information acquired by a detection sensor with low separability may be unstable without sufficient separation of the individual objects. If target information acquired by a detection sensor with a low resolution is destabilized, processing to fuse (perform fusion on) that information with target information acquired by a detection sensor with a high resolution is also destabilized, which reduces the object determination accuracy. For example, when target information acquired by a detection sensor with low separability is destabilized due to insufficient separation between different adjacent targets, the target to be fused in target information acquired by a detection sensor with high separability is changed, which reduces the object determination accuracy.

In view of the above, an object of the present disclosure is to provide a technique for ensuring the accuracy of an object detection device that detects objects by acquiring and fusing the target information of the objects using a plurality of detection sensors with different detection accuracies.

Figure 1:
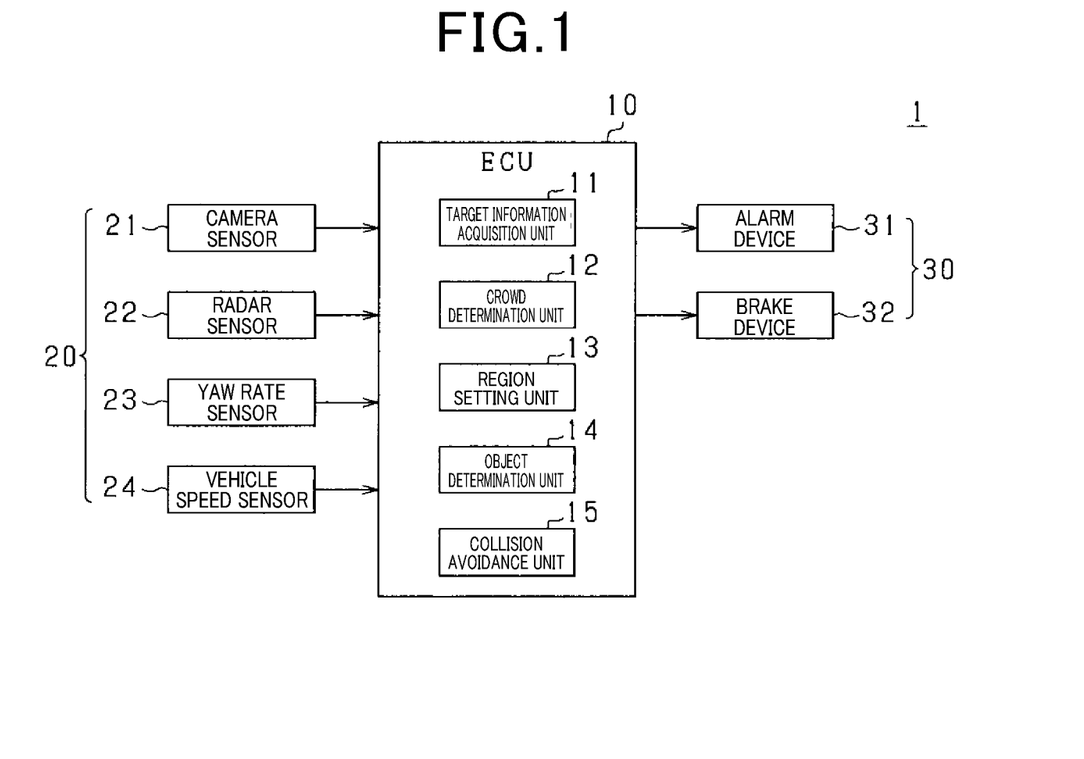
FIG. 1 is a block diagram of a traveling support device including an object detection device according to an embodiment.

As shown in FIG. 1, a traveling support device 1 includes an ECU 10, sensors 20, and a safety device 30 to be controlled. The traveling support device 1 is a pre-crash safety system (PCS), and is mounted, for example, in a vehicle such as a passenger car.

As the sensors 20, for example, a camera sensor 21, a radar sensor 22, a yaw rate sensor 23, and a vehicle speed sensor 24 are provided.

The camera sensor 21 is configured using a CCD camera, a monocular camera, a stereo camera, or the like, and is installed, for example, near the top edge of the windshield of the own vehicle. The camera sensor 21 images an area extending in a predetermined region towards the front of the own vehicle at predetermined time intervals, and acquires captured images. Then, the captured images are subjected to image processing to thereby acquire the shape (size) of objects in front of the own vehicle, the distance to the objects, and the like as target information. Further, the camera sensor 21 performs well-known image processing, such as template matching, on the captured images to thereby also acquire the types of predetermined objects (vehicles, pedestrians, road obstacles, and the like) present within the angle of imaging view as target information. In the present embodiment, a plurality of dictionaries, which are image patterns showing the characteristics of each object, are stored as templates for identifying the type of each object. The stored dictionaries include a whole-body dictionary in which the entire characteristics of objects are put into patterns, and a half(partial)-body dictionary in which the partial characteristics of objects are put into patterns.

The radar sensor 22 also detects the shape and size of an object by emitting directional electromagnetic waves at the object, and receiving the reflected waves from the object. More specifically, the radar sensor 22 detects objects in front of the own vehicle by using directional electromagnetic waves, such as millimeter waves and lasers, and is attached to the front of the own vehicle so that its optical axis faces the front of the own vehicle. The radar sensor 22 scans an area extending in a predetermined region towards the front of the own vehicle by radar signals at predetermined time intervals, and receives electromagnetic waves reflected from the surface of an object outside the vehicle to thereby acquire the distance to the object, the speed relative to the object, and the like as target information.

The camera sensor 21 and the radar sensor 22 are examples of detection sensors that detect objects around the own vehicle. The present embodiment describes an example in which the camera sensor 21 is used as a detection sensor with a higher resolution, and the radar sensor 22 is used as a detection sensor with a lower resolution; however, the types of sensors that can be used as the detection sensors for detecting objects are not limited thereto.

The yaw rate sensor 23 is configured as a well-known yaw rate sensor that detects the turning angular speed of the vehicle. The vehicle speed sensor 24 detects the rotation speed of the wheel, i.e., the traveling speed of the vehicle. The detection results by the sensors 20 are acquired by the ECU 10.

The ECU 10 includes a target information acquisition unit 11, a crowd determination unit 12, a region setting unit 13, an object determination unit 14, and a collision avoidance unit 15. The ECU 10 is an electronic control unit including a CPU, a ROM, a RAM, and the like. The CPU realizes the functions of the above units by executing previously stored programs. The ECU 10 can realize the functions of the target information acquisition unit 11, the crowd determination unit 12, the region setting unit 13, and the object determination unit 14 based on the input signals from the sensors 20, thereby realizing the function as an object detection device. Moreover, the ECU 10 can realize the function as a vehicle collision avoidance device based on the object detection results by further including the collision avoidance unit 15.

The target information acquisition unit 11 acquires target information obtained by detecting objects around the own vehicle as targets by the camera sensor 21 and the radar sensor 22. More specifically, each object around the own vehicle is detected as a first target by the camera sensor 21, and as a second target by the radar sensor 22. Then, the target information acquisition unit 11 acquires, for each object around the own vehicle, first target information, which is the information of the first target, from the camera sensor 21, and second target information, which is the information of the second target, from the radar sensor 22. For example, as shown in FIG. 2, when pedestrian targets 50 to 52, 61, and 62, which indicate pedestrians present in front of the traveling direction of the own vehicle 40, are detected by the camera sensor 21 and the radar sensor 22, the target information acquisition unit 11 acquires first target information and second target information for each of the pedestrian targets 50 to 52, 61, and 62 from both of the camera sensor 21 and the radar sensor 22.

The crowd determination unit 12 selects a reference target from the detected targets. The crowd determination unit 12 further sets a crowd region in a predetermined region based on the reference target, and determines that other targets (targets that are not set as the reference target) detected in the crowd region are crowd targets. The crowd determination unit 12 is preferably configured to set the reference target and the crowd targets based on target information acquired from a detection sensor with higher separability among a plurality of detection sensors. In the present embodiment, the reference target and the crowd targets are set based on the first target information acquired from the camera sensor 21.

Further, the crowd determination unit 12 is preferably configured to set, as the reference target, a target closest to the current own vehicle among targets detected in an own vehicle track, which is the future moving track of the own vehicle. Since the target closest to the current own vehicle can be estimated to be a target that indicates an object with a high possibility of collision with the own vehicle, crowd determination can be performed using the target closest to the current own vehicle as the reference target to thereby set the crowd determination region in a region in which the target with a high possibility of collision with the own vehicle is detected.

Figure 2:
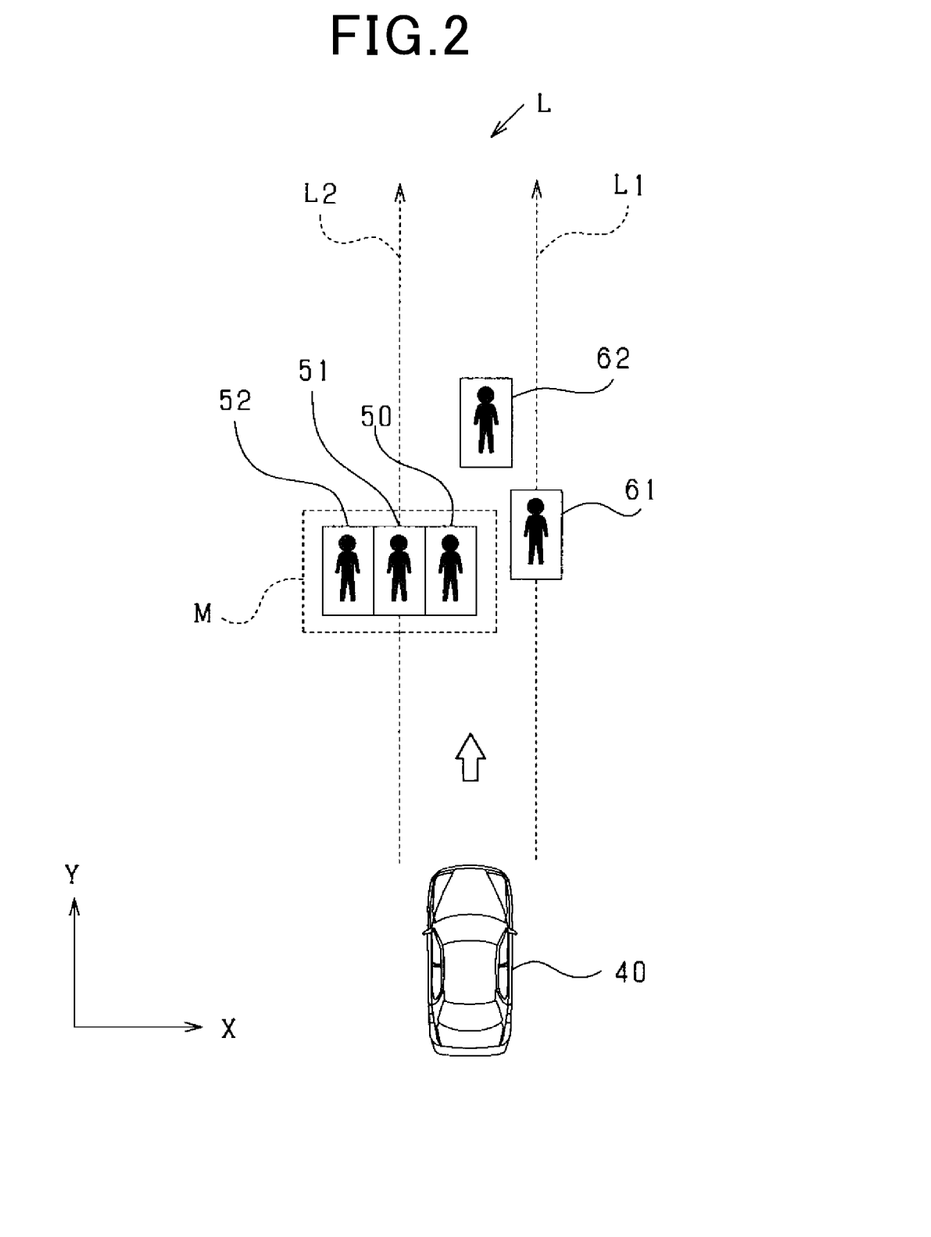
FIG. 2 is an explanatory diagram of a search region according to the embodiment.

For example, as shown in FIG. 2, the own vehicle track, which is the future moving track of the own vehicle 40 traveling straight ahead (in the positive direction of the Y-axis), can be calculated as an own vehicle track L extended by a predetermined distance in the left-right direction from the left and right ends of the own vehicle 40. The left end L1 of the own vehicle track L is located on the left side by a predetermined distance from the left end of the own vehicle 40, and the right end L2 is located on the left side by a predetermined distance from the left end of the own vehicle 40. When pedestrian targets 50 to 52, 61, and 62 are detected as targets indicating objects around the own vehicle 40, the pedestrian target 50, which is detected in the own vehicle track L of the own vehicle 40 and is closest to the own vehicle 40, is set as a reference target. Then, among the pedestrian targets 51, 52, 61, and 62, targets detected in a predetermined region from the pedestrian target 50, which is set as the reference target, are set as crowd targets.

The crowd determination unit 12 can set, for example, a region within a predetermined distance from the reference target as the crowd region. More specifically, for example, the distance in the longitudinal direction (positive or negative direction of the Y-axis shown in FIG. 2) (longitudinal distance), which is the traveling direction of the own vehicle 40, and the distance in the lateral direction (positive or negative direction of the X-axis shown in FIG. 2) (lateral distance), which is perpendicular to the traveling direction of the own vehicle 40, may be used to set a region in which the longitudinal or lateral distance from the reference target is equal to or less than a predetermined threshold value as the crowd region. The crowd region may be set all around the reference target as the center (all directions in front, back, left, and right), or may be biased in a certain direction, for example, only in the lateral direction.

For example, when the pedestrian target 50 is set as the reference target, the crowd region may be set in a region in which the longitudinal distance from the pedestrian target 50 is less than a predetermined lateral threshold value Xt and the longitudinal distance is less than a predetermined longitudinal threshold value Yt. In this case, the pedestrian targets 51 and 52 detected in the crowd region are set as the crowd targets. The pedestrian target 52 is a target outside the own vehicle track L, but in the crowd region; thus, the pedestrian target 52 is set as a crowd target. On the other hand, the pedestrian target 61 is a target in the own vehicle track L, but is detected in a position where the lateral distance from the pedestrian target 50 is equal to or more than the lateral threshold value Xt and the longitudinal distance is equal to or more than the longitudinal threshold value Yt; thus, the pedestrian target 61 is not set as a crowd target. In addition, the pedestrian target 62 is a target in the own vehicle track L, but is detected in a position where the lateral distance from the pedestrian target 50 is less than the lateral threshold value Xt, whereas the longitudinal distance is equal to or more than the longitudinal threshold value Yt; thus, the pedestrian target 62 is not set as a crowd target.

The region setting unit 13 sets a search region so as to include the crowd determination region in which the reference target and the crowd targets are detected. The crowd determination region is set in a region that includes a crowd determination target group formed by the reference target and the crowd targets. For example, in FIG. 2, the pedestrian targets 50 to 52 form a crowd determination target group, and a region within the dashed line indicating the outer periphery of the crowd determination target group can be set as a crowd determination region M. The search region may be equal to the crowd determination region M, or may be a region further expanded around the crowd determination region M. The search region is set in a region that includes the crowd determination target group, but does not include targets other the crowd targets indicated by the pedestrian targets 61 and 62.

The object determination unit 14 fuses the target information detected in the search region to determine the objects indicted by the targets in the search region. More specifically, the object determination unit 14 of the ECU 10 fuses the first target information acquired from the camera sensor 21 and the second target information acquired from the radar sensor 22 for the same object, thereby detecting the object.

The object determination unit 14 may be configured to select a representative target from the targets detected in the crowd determination region, and to fuse target information while prioritizing the representative target over the other targets in the crowd determination region. As the representative target, for example, a target that indicates an object with a high risk of collision with the own vehicle may be selected from the targets detected in the crowd determination region. More specifically, among the targets detected in the crowd determination region, for example, a target with the shortest lateral distance from the own vehicle may be set as the representative target. When the actual traveling route of the own vehicle deviates laterally from the predicted own vehicle track, or when the lateral position of the target information of the detection sensor deviates, an object with a high possibility of collision with the own vehicle can be detected. When the representative target is selected in FIG. 2, among the pedestrian targets 50 to 52 detected in the crowd determination region M, the pedestrian target 50 closest to the own vehicle 40 is selected as the representative target.

The collision avoidance unit 15 executes collision determination to determine whether there is a possibility that an object determined by the object determination unit 14 collides with the own vehicle based on whether parameter values (relative speed, relative distance, moving amount in the lateral direction, and the like) relating to the positional relationship between the object and the own vehicle satisfy preset reference conditions.

The collision avoidance unit 15 further controls the safety device 30 based on the result of collision determination. This tries to prevent the collision between the own vehicle and the detected object and to mitigate the damage thereof. Examples of the safety device 30 include an alarm device 31 and a brake device 32, as shown in FIG. 1. In addition, the safety device 30 may include actuators for driving a steering wheel, seat belts, and the like.

When it is determined, for example, that there is a risk of collision, the collision avoidance unit 15 controls the alarm device 31 to give notification to the driver and the object pedestrians, bicycles, and the like, and controls the brake device 32 to deaccelerate or stop the own vehicle. In this manner, the collision avoidance unit 15 tries to avoid the collision between the own vehicle and the objects around the own vehicle detected by the ECU 10.

The object detection processing and collision avoidance processing executed by the ECU 10 will be described based on the flowchart shown in FIG. 3. The processing shown in FIG. 3 is repeatedly executed at every predetermined cycle.

Figure 3:
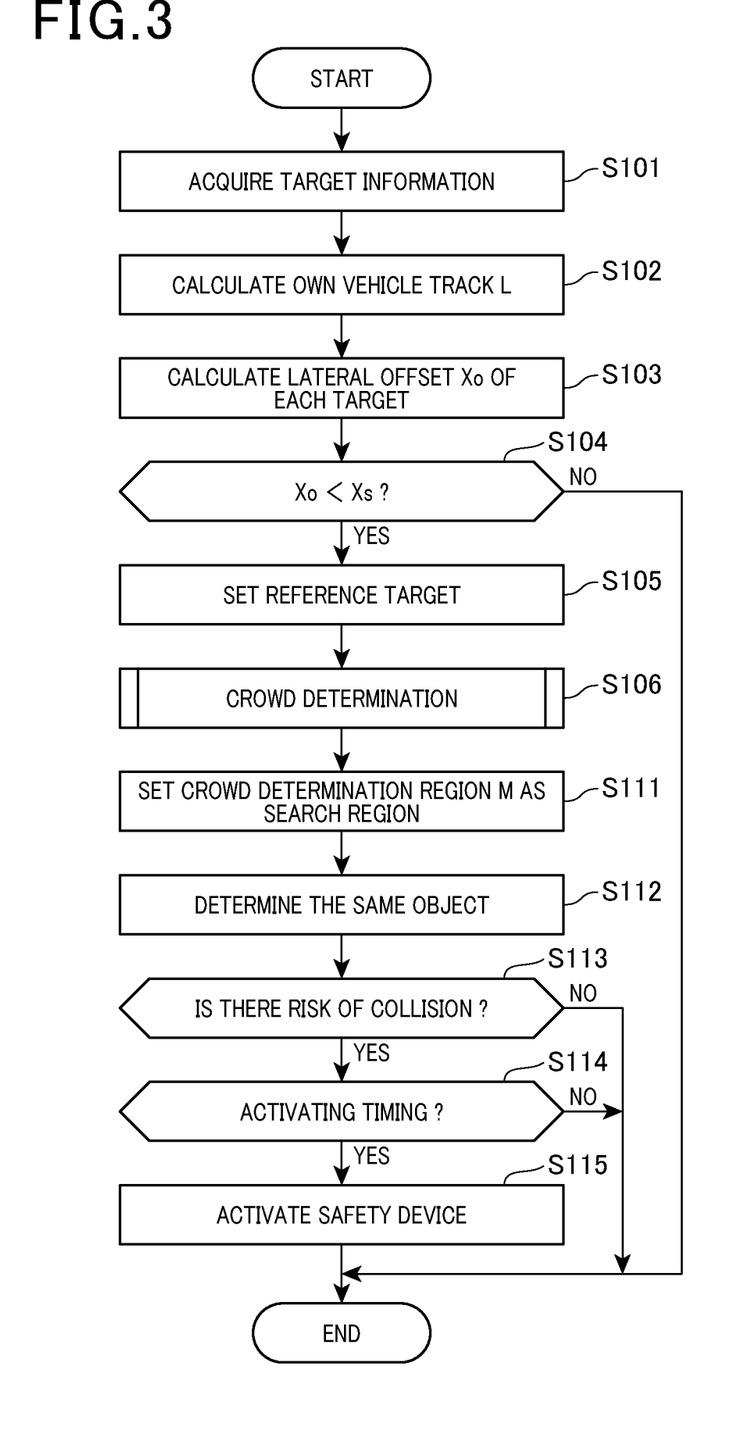
FIG. 3 is a flowchart illustrating object detection processing and collision avoidance processing executed by an ECU.

As shown in FIG. 3, first in step S101, target information (first target information and second target information) is acquired for each of the objects detected by the camera sensor 21 and the radar sensor 22. Then, the processing proceeds to step S102.

In step S102, an own vehicle track, which is the future traveling route of the own vehicle, is calculated. For example, as shown in FIG. 2, for the own vehicle 40 traveling straight ahead, an own vehicle track L defined by a left end L1 and a right end L2 is calculated. Then, the processing proceeds to step S103.

In step S103, a lateral offset Xo, which is the distance in the lateral direction between each target detected in step S101 and the own vehicle track L calculated in step S102, is calculated. The lateral offset Xo is calculated as the distance between each target in the longitudinal direction position of each target and the own vehicle track L. Then, the processing proceeds to step S104.

In step S104, it is determined whether there is a target whose lateral offset Xo is less than a predetermined offset threshold value Xs. This processing determines whether each target is within the own vehicle track L. The offset threshold value Xs is set based on the own vehicle track L calculated in step S102, and is set as the minimum lateral offset of the target present outside the own vehicle track L. When Xo<Xs is satisfied, the target is present in the own vehicle track L, and the processing proceeds to step S105. When Xo≥Xs is satisfied, the target is not present within the own vehicle track L, and the processing is terminated.

In step S105, a reference target is set based on the target information acquired in step S101. For example, among the targets that have been determined to satisfy Xo<Xs in step S104, a target detected in the position closest to the current own vehicle is set as the reference target based on the first target information acquired from the camera sensor 21. Then, the processing proceeds to step S106.

In step S106, the crowd determination of each target is executed. The crowd determination processing is executed according to the flowchart shown in FIG. 4.

Figure 4:
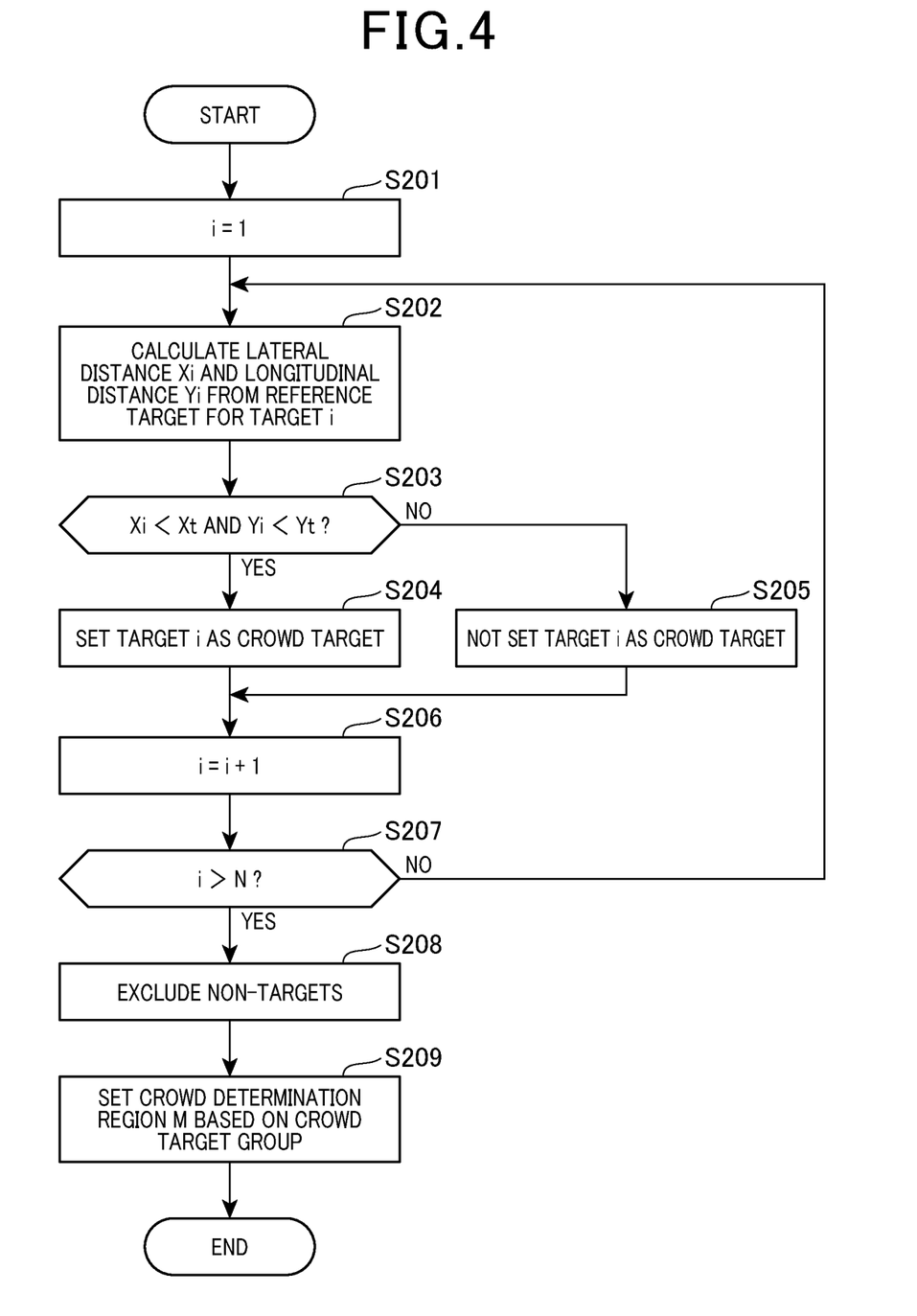
FIG. 4 is a flowchart illustrating crowd determination processing shown in FIG. 3.

As shown in FIG. 4, for N targets, crowd determination is executed for each target i (i=1, 2 . . . N). First, in step S201, i=1 is executed, and the processing proceeds to step S202.

In step S202, the distances from the reference target are calculated for the target i based on the target information acquired in step S101. Specifically, the lateral distance Xi and longitudinal distance Yi from the reference target are calculated. The distances from the reference target are preferably calculated based on the first target information; however, the first target information and the second target information may be used in combination. Then, the processing proceeds to step S203.

In step S203, it is determined, for target i, whether the distances from the reference target calculated in step S202 are shorter than predetermined threshold values. Specifically, it is determined whether the lateral distance Xi is less than a lateral threshold value Xt, and the longitudinal distance Yi is less than a longitudinal threshold value Yt. When Xi<Xt and Yi<Yt are satisfied, the processing proceeds to step S204, and the target i is set as a crowd target. When Xi≥Xt or Yi≥Yt is satisfied, the processing proceeds to step S205, and the target i is not set as a crowd determination target. After steps S204 and S205, the processing proceeds to step S206.

In step S206, i=i+1 is executed, and the processing proceeds to step S207. In step S207, it is determined whether i>N is satisfied. When i>N is satisfied, the processing shown in steps S202 to S205 has been completed for all of the N-number of targets, and the processing proceeds to step S208. When i≤N is satisfied, the processing returns to step S202.

In step S208, from the targets set as the crowd targets in step S204, those corresponding to non-targets are excluded. Non-targets are targets that are determined to be inappropriate to form crowds together with the reference target, based on the movement states, types, and the like of the targets. Specifically, for example, when the reference target indicates a pedestrian, among targets other than the reference target, those indicating pedestrians may be set as crowd targets, and those indicating bicycles and motorcycles may be set as non-crowd targets. In this case, when the targets are recognized as a bicycle and a motorcycle from their movement states (movement speed, and the like), shapes, and the like, based on the target information acquired in step S101, the setting as crowd targets is cancelled. In the present embodiment, the type of an object (vehicle, pedestrian, road obstacles, and the like) can be identified based on the first target information acquired from the camera sensor 21. Then, the processing proceeds to step S209.

In step S209, the targets set as crowd targets form a crowd target group. Then, a crowd determination region M is set based on the crowd target group. Specifically, for example, the entire region in which the crowd target group is detected is set as the crowd determination region M. Then, a series of processing shown in FIG. 4 is terminated, and the processing proceeds to step S111 shown in FIG. 3.

In step S111, a search region is set so as to include the entire crowd determination region M set in the crowd determination processing shown in step S106. Then, the processing proceeds to step S112.

In step S112, in the search region set in step S111, for the same object, the first target information detected by the camera sensor 21 and the second target information detected by the radar sensor 22 are fused to detect the object indicated by the target. When target information is detected by only one of the camera sensor 21 and the radar sensor 22, the target information may be used to detect objects. Then, the processing proceeds to step S113.

In step S113, the targets fused in the search region are used as objects to be avoided, and the possibility of collision between the objects to be avoided and the own vehicle is determined. Specifically, for example, the time-to-collision (TTC), which represents the time until the own vehicle and the object to be avoided collide with each other, is calculated based on the behavior and relative speed of the object to be avoided. Then, when the time-to-collision is equal to or less than a predetermined threshold value, it is determined that there is a risk of collision. When it is determined that there is a risk of collision, the processing proceeds to step S114. When it is determined that there is no risk of collision, the processing is terminated.

In step S114, it is determined whether the timing is a timing for activating the safety device 30 for collision avoidance, based on the course of the object to be avoided, the distance between the object to be avoided and the own vehicle, the relative speed of the object to be avoided, and the like. When the timing is a timing for activating the safety device 30, the processing proceeds to step S115 to execute the processing to activate the safety device 30, and the processing is terminated.

As described above, in step S105, the ECU 10 sets a reference target selected from the targets detected by the detection sensors. Then, in step S106, when targets other than the reference target are detected in a predetermined crowd region set based on the reference target, the targets other than the reference target are determined as crowd targets. More specifically, among the targets other than the reference target, targets whose lateral distance Xi and longitudinal distance Yi from the reference target satisfy $Xi<Xt$ and $Yi<Yt$ are determined as crowd targets. Then, in step S111, a search region is set so as to include a crowd determination region M in which the reference target and the crowd targets are detected. Therefore, when fusing target information for determining the same object in step S112, the target information can be fused for the search region including the crowd determination region M. As a result, even if the target information on each object acquired from a detection sensor with low separability is destabilized, the objects can fall within the crowd determination region M, and the entire search region does not deviate. Since it is possible to suppress the deviation of the search region by a detection sensor with a low resolution, it is possible to prevent the reduction in the accuracy of object determination. As a result, the target information of objects is acquired using a plurality of detection sensors with different detection accuracies and fused, thereby ensuring the accuracy of the object detection device that detects objects.

According to each of the above embodiments, the following effects can be obtained.

The ECU 10 functions as an object detection device that detects objects around the own vehicle by fusing a plurality of pieces of target information obtained by detecting the objects as targets by a plurality of detection sensors with different detection accuracies (e.g., camera sensor 21 and radar sensor 22). The ECU 10 includes a crowd determination unit 12, a region setting unit 13, and an object determination unit 14. The crowd determination unit 12 determines that targets other than a reference target detected in a predetermined crowd region based on the reference target selected from the targets are crowd targets. The region setting unit 13 sets a search region so as to include a crowd determination region in which the reference target and the crowd targets are detected. Then, the object determination unit 14 determines the objects indicated by the targets in the search region by fusing the target information for the search region. Therefore, when fusing the target information in the object determination unit 14, the target information can be fused for the search region set so as to include the crowd determination region in which a plurality of targets are detected in the region setting unit 13. As a result, even if the target information on each object acquired from a detection sensor with low separability is unstable, the objects fall within the crowd determination region, and the search region does not deviate, which can prevent the reduction in the accuracy of object determination. That is, the object detection accuracy can be ensured in an object detection device that detects objects by acquiring and fusing the target information of the objects using a plurality of detection sensors with different detection accuracies.

The crowd determination unit 12 may be configured to set the target closest to the own vehicle in the future moving track of the own vehicle as a reference target. Thus, the reference target is set and crowd determination is performed, whereby the crowd determination region can be set in a region in which a target with a high possibility of collision with the own vehicle is detected.

The object determination unit 14 may be configured to set, among the targets detected in the crowd determination region, a target with a high risk of collision with the own vehicle as a representative target, and to fuse the target information while prioritizing the representative target over the other targets in the crowd determination region. After the crowd determination region is set, a representative target with a high risk of collision with the own vehicle is set, and the target information is preferentially fused, whereby even if there is a deviation in the own vehicle track, a deviation in detection by the detection sensor, or the like, objects with a high possibility of collision with the own vehicle can be detected with high accuracy.

The control unit and the method thereof described in the present disclosure may be realized by a dedicated computer provided by configuring a processor and memory programmed to perform one or more functions embodied in a computer program. Alternatively, the control unit and the method thereof described in the present disclosure may be realized by a dedicated computer provided by configuring a processor with one or more dedicated hardware logic circuits. Alternatively, the control unit and the method thereof described in the present disclosure may be realized by one or more dedicated computers configured by a combination of a processor and memory programmed to perform one or more functions, and a processor configured with one or more hardware logic circuits. In addition, the computer program may be stored in a computer-readable, non-transitory tangible storage medium as instructions to be executed by a computer.

The present disclosure is described according to embodiments; however, it is understood that the present disclosure is not limited to the embodiments and configurations. The present disclosure also includes various modified examples and modifications within an equivalent range. In addition, various combinations and configurations, and other combinations and configurations including more, less, or only a single element, are also within the spirit and scope of the present disclosure.

The present disclosure provides an object detection device (10) that detects objects around an own vehicle by fusing a plurality of pieces of target information obtained by detecting the objects as targets using a plurality of detection sensors (21, 22) with different detection accuracies, the object detection device including: a crowd determination unit (12) that determines whether a target other than a reference target detected in a predetermined crowd region based on the reference target selected from the targets is a crowd target; a region setting unit (13) that sets a search region so as to include a crowd determination region in which the reference target and the crowd target are detected; and an object determination unit (14) that determines (identifies) an object indicated by a target in the search region by fusing the target information for the search region.

According to the above object detection device, when an object other than a reference target is detected in a predetermined crowd region set based on the reference target selected from the targets detected by the detection sensors, the crowd determination unit determines that the target other than the reference target is a crowd target. Then, the region setting unit sets a search region so as to include a crowd determination region in which the reference target and the crowd target are detected. Therefore, when fusing target information in the object determination unit, the target information can be fused for the search region including the crowd determination region. Since the target information is fused for the search region that is set to include the crowd determination region in which a plurality of targets are detected, even if target information for individual objects acquired from a detection sensor with low separability is destabilized, the objects fall within the crowd determination region, and the search region does not deviate, which can prevent the reduction in the object determination accuracy. As a result, the target information of objects is acquired using a plurality of detection sensors with different detection accuracies and fused, thereby ensuring the accuracy of the object detection device that detects objects.

What is claimed is:

1. An object detection device that detects objects around an own vehicle by fusing a plurality of pieces of target information obtained by detecting the objects as targets using a plurality of detection sensors with different detection accuracies, the object detection device comprising a storage medium storing instructions and a processor, wherein the processor executes the instructions to cause performance of operations comprising:
    selecting a reference target from targets detected by a particular detection sensor with higher separability among the plurality of detection sensors, the reference target being selected from the targets detected by the particular detection sensor as opposed to from other targets detected by one or more other detection sensors of the plurality of detection sensors because the particular detection sensor has higher separability than the one or more other detection sensors;
    setting a predetermined crowd region based on the reference target;
    determining whether a target detected in the predetermined crowd region is a crowd target, the target being different from the reference target, wherein the determining of whether the target detected in the predetermined crowd region is a crowd target includes excluding a target that is determined to be inappropriate to form a corresponding crowd together with the reference target, based on at least one of a movement state and a type of the target;
    setting a search region so as to include the predetermined crowd region in which the reference target and the crowd target are detected, wherein the search region is set in a region that includes the reference target and the crowd target, but does not include targets other than the reference target and the crowd target; and
    determining an object in the search region by fusing the target information for the search region.

2. The object detection device according to claim 1, wherein the operations further comprise selecting, as the reference target, a target closest to the own vehicle and detected in a future moving track of the own vehicle.

3. The object detection device according to claim 1, wherein the operations further comprise selecting, as a representative target, a target with the highest risk of collision with the own vehicle among the targets detected in the predetermined crowd region, and fuses the target information while prioritizing the representative target over targets other than the representative target in the predetermined crowd region.

4. The object detection device according to claim 2, wherein the operations further comprise selecting, as a representative target, a target with the highest risk of collision with the own vehicle among the targets detected in the predetermined crowd region, and fuses the target information while prioritizing the representative target over targets other than the representative target in the predetermined crowd region.

* * * * *